Sept. 26, 1950 S. D. DICKSON 2,523,650
SCRAPER BOARD AND PROCESS OF MAKING
Filed July 6, 1945
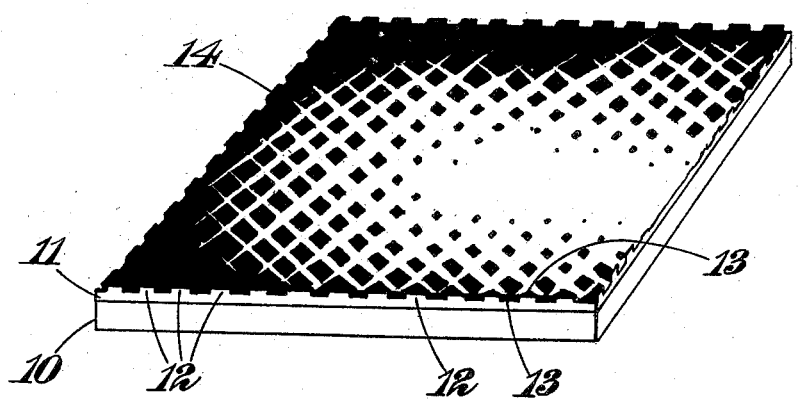
INVENTOR
Stanley Douglas Dickson Patented Sept. 26, 1950

2,523,650

UNITED STATES PATENT OFFICE 2,523,650

SCRAPER BOARD AND PROCESS OF MAKING

Stanley Douglas Dickson, London, England

Application July 6, 1945, Serial No. 603,475
In Great Britain July 10, 1944

3 Claims. (Cl. 117—164)

This invention relates to scraper or process boards and like bodies capable of being engraved or carved, for example, for artistic purposes, and which may be used in printing or other reproducing processes, which bodies are hereinafter referred to as scraper boards.

It is known to employ a scraper board formed with a surface of such a character that it may be readily engraved by an artist and so that reproductions can be obtained from the engraved surface, either by taking an impression from it and using the impression as a block for printing, or by forming a block from the engraved surface by a suitable photo engravure process, in which case the surface is suitably coloured so that the engraved portion stands out in contrast. Art papers are also known in which a layer of china clay, usually under a thousandth-of-an-inch thick, is applied to the surface of a paper stock.

According to this invention, a scraper board for use in printing or for other artistic purposes comprises a comparatively thick layer of china clay mixed with a bonding agent, which layer is consolidated by a suitable pressure treatment.

Preferably, the china clay is in a colloidal form and the colloidal clay particles are encased in said bonding agent. This may be assisted by the employment of a suitable dispersing or deflocculating agent, for example, a penetrating oil such as suphonated castor oil, which ensures that the colloidal clay particles are individually surrounded by the bonding agent.

The bonding agent may comprise an organic adhesive, such as gelatine or glue, with which is incorporated a fungicide, such as sodium orthophenylphenate.

The china clay surface may be treated with aniline or a natural pigment, which is applied in such a manner as only to treat the outer layer.

The china clay is preferably applied to a comparatively rigid backing, such, for example, as paste-board, ply-board or even sheet metal.

The china clay surface may be formed with a decorative grain.

A method of forming a process or scraper board according to this invention consists in applying a mixture of colloidal clay and binding agent by a spray gun on to a backing and consolidating the surface by pressure.

There may be applied to the spray gun a negative static charge which assists in effecting an even dispersal of the clay. This may be further assisted by incorporation in the mixture of small quantities of sodium silicate. Sodium silicate also operates as a dispersing agent.

The following is a description of one method of forming a scraper board according to the invention.

The mixture for application to a backing layer may comprise the following ingredients in the following proportions.

Colloidal china clay _____ about__ 112 pounds
Powdered refined gelatine _____ about__ 18 pounds
Sulphonated castor oil _____ about__ 2 fluid ounces
Sodium orthophenyl-
  phenate _____ about__ 3 fluid ounces
Sodium silicate _____ about__ 6 fluid ounces
Water _____ about__ 20 gallons As indicated above, sodium silicate has a dual function operating as a dispersing agent, and also as an agent assisting the action of the negative charge applied to the gun. Thus, it may be possible to eliminate the use of sulphonated castor oil in the above mixture.

The gelatine is first dissolved in boiling water; the other ingredients are then added to it in a mechanical mixer for such time as will produce a homogeneous mix. A suitable length of time has been found to be under half an hour. The consistency of the mixture thus produced is a thin cream which is capable of being sprayed by a compressed air gun.

The mixture is then sprayed on to a suitable pasteboard or pulpboard, arranged flat, the nozzle of the gun being electrically connected to means for imparting to it a negative electric charge, for example, from the negative side of a thermionic generator.

In order to obtain an even coating, the backing is traversed beneath spray guns which are continually moving backwards and forwards in a direction transverse to the traverse of the backing. The conditions are selected so as to build up a required thickness from 20 thousandths-of-an-inch upwards. The coated board is then allowed to set under atmospheric conditions over a period of about 14 to 15 hours.

In the case where the boards are required to be provided with a tinted surface, a thin layer of a mixed casein bonded ink may be applied, for example, by spraying.

Should a smooth finish engraving surface be required, the layer may be consolidated by passing the coated surface between highly polished metal pressure rollers or pressure plates, which may be provided with stainless steel or nickel surfaces. In the case of a grained surface, the treated backings may be passed through embossing rollers or pressure plates.

A portion of a scraper board thus prepared is shown in the accompanying drawing, in which a backing 10 of paste-board has applied to it a layer 11 of china clay mixture, the outer surface of which is grained as indicated at 12 and is coated at 13 with a casein ink of a suitable thickness so as to enable the china clay surface to be exposed by a simple etching operation, as indicated at 14.

I claim:

1. A method of forming a scraper board which comprises preparing a uniform aqueous dispersion of about 112 parts of china clay in colloidal form, 18–20 parts of gelatin and sufficient dispersing agent to maintain the clay in dispersion, applying said dispersed mixture in a layer to a backing in a thickness of at least about 20 thousandths of an inch while maintaining it in the dispersed condition and consolidating the layer by pressure.

2. A method of forming a scraper board which comprises preparing a uniform aqueous dispersion of about 112 parts of china clay in colloidal form, about 18–20 parts of gelatin, applying said mixture in a layer to a backing in a thickness of at least 20 thousandths of an inch by spraying while maintaining it in a dispersed condition by charging the spray nozzle and consolidating the layer by pressure.

3. A scraper board comprising a backing sheet having on one surface thereof an engraveable layer of material at least 20 thousandths of an inch in thickness and obtained by applying to the backing a uniform layer of an aqueous dispersion of about 112 parts of china clay in colloidal form, 18–20 parts of gelatin and sufficient dispersing agent to maintain the clay in dispersion and consolidating the layer by pressure.

STANLEY DOUGLAS DICKSON.

REFERENCES CITED

The following references are of record in the file of this patent:

UNITED STATES PATENTS

| Number | Name | Date |
|---|---|---|
| Re. 11,363 | Hoke | Sept. 5, 1893 |
| 1,624,091 | Colbert | Apr. 12, 1927 |
| 1,766,302 | Muir | June 24, 1930 |
| 1,923,483 | Glenn | Aug. 22, 1933 |
| 2,214,564 | Montgomery | Sept. 10, 1940 |
| 2,302,289 | Bramston-Cook | Nov. 17, 1942 |
| 2,311,271 | Ware | Feb. 16, 1943 |